(12) United States Patent
Friedman et al.

(10) Patent No.: US 11,729,123 B2
(45) Date of Patent: Aug. 15, 2023

(54) SYSTEMS AND METHODS FOR SENDING CONTENT (71) Applicant: Toyota Motor Engineering & Manufacturing North America, Inc., Erlanger, KY (US)

(72) Inventors: Scott A. Friedman, Dallas, TX (US); Prince R. Remegio, Lewisville, TX (US); Tim Uwe Falkenmayer, Mountain View, CA (US); Roger Akira Kyle, Lewisville, TX (US); Ryoma Kakimi, Ann Arbor, MI (US); Luke D. Heide, Plymouth, MI (US); Nishikant Narayan Puranik, Frisco, TX (US)

(73) Assignee: TOYOTA MOTOR ENGINEERING & MANUFACTURING NORTH AMERICA, INC., Erlanger, KY (US)

( * ) Notice: Subject to any disclaimer, the term of this patent is extended or adjusted under 35 U.S.C. 154(b) by 756 days.

(21) Appl. No.: 15/830,843

(22) Filed: Dec. 4, 2017

(65) Prior Publication Data

US 2019/0173818 A1 Jun. 6, 2019

(51) Int. Cl.
G06F 15/16 (2006.01)
H04L 51/10 (2022.01)
H04L 51/063 (2022.01)
H04L 67/12 (2022.01)
H04L 51/066 (2022.01)
H04L 67/306 (2022.01)
H04L 51/08 (2022.01)
H04L 51/52 (2022.01)

(52) U.S. Cl.
CPC ............ *H04L 51/10* (2013.01); *H04L 51/063* (2013.01); *H04L 51/066* (2013.01); *H04L 51/08* (2013.01); *H04L 51/52* (2022.05); *H04L 67/12* (2013.01); *H04L 67/306* (2013.01)

(58) Field of Classification Search
CPC ..... H04L 51/10; H04L 51/063; H04L 51/066; H04L 51/32; H04L 67/12
USPC ......................................... 709/206
See application file for complete search history.

(56) References Cited

U.S. PATENT DOCUMENTS

| | | | |
|---|---|---|---|
| 7,613,736 B2 | 11/2009 | Hicken | |
| 8,230,099 B2 | 7/2012 | Weel | |
| 8,881,216 B2 | 11/2014 | Putnam et al. | |
| 9,560,148 B2 | 1/2017 | Kim et al. | |
| 2008/0104172 A1* | 5/2008 | Craig | H04L 67/306 709/204 |
| 2008/0194196 A1 | 8/2008 | Angelhag et al. | |
| 2009/0077062 A1* | 3/2009 | Spivack | G06Q 30/02 |
| 2009/0199230 A1* | 8/2009 | Kumar | G06Q 30/02 725/32 |

(Continued)

*Primary Examiner* — Alan S Chou
(74) *Attorney, Agent, or Firm* — Dinsmore & Sholh LLP (57) ABSTRACT Systems and methods for sending content are provided. One embodiment of a method includes identifying content provided to a user, receiving an indication that the user desires to share the content to a recipient, and determining a content provider that provided the content to the user and a preferred content provider of the recipient. Some embodiments are configured for determining an address associated with the recipient and providing instructions for the preferred content provider to provide the content to the recipient.

20 Claims, 7 Drawing Sheets (56) References Cited

U.S. PATENT DOCUMENTS

2014/0282166 A1* 9/2014 Temkin ............... G06F 3/04845
　　　　　　　　　　　　　　　　　　　　　715/769
2016/0210662 A1* 7/2016 Duggal .............. G06Q 30/0251
2016/0359987 A1* 12/2016 Laliberte ................ H04L 51/32
2017/0104824 A1 4/2017 Bajwa et al.

* cited by examiner

SYSTEMS AND METHODS FOR SENDING CONTENT

TECHNICAL FIELD

Embodiments described herein generally relate to systems and methods for sending content and, more specifically, to sending content in a format as desired by a recipient.

BACKGROUND

The integration of vehicle operation with various infotainment systems has caused vehicle users to desire greater functionality from their vehicles. As such, many current vehicles include internet capabilities, as well as content library playback options for content such as music, videos, etc. Additionally, while the vehicle users may receive content from the infotainment system, currently there is no mechanism for sharing content with others.

SUMMARY

Systems and methods for sending content are provided. One embodiment of a method includes identifying content provided to a user, receiving an indication that the user desires to share the content to a recipient, and determining a content provider that provided the content to the user and a preferred content provider of the recipient. Some embodiments are configured for determining an address associated with the recipient and providing instructions for the preferred content provider to provide the content to the recipient.

In another embodiment, a vehicle for sending content includes a receiver for receiving content, a transmitter for communicating data related to the content, and a vehicle computing device that is communicatively coupled to the receiver and the transmitter and includes a processor and a memory component. The memory component stores logic that, when executed by the processor, causes the vehicle computing device to receive the content from a first content provider, identify content that was received from the first content provider, provide an option to a user to share the content with a recipient. In some embodiments the logic causes the vehicle computing device to receive a user selection of the option to share the content to the recipient, determine a preferred content provider for sharing the content with the recipient, and determine an address associated with the recipient. In some embodiments, the logic causes the vehicle computing device to generate a message to a user device of the recipient that includes instructions for the user device to access the content via a platform of the preferred content provider and send the message to the user device of the recipient via a desired message format.

In yet another embodiment, a system includes a computing device that includes a processor and a memory component. The memory component stores logic that, when executed by the processor, causes the system to receive the content from a first content provider, provide the content to a user, and identify content that was received from the first content provider. The logic further causes the system to determine a preferred content provider for sharing the content with a recipient, determine an address associated with the recipient, and generate a message to a user device of the recipient that includes instructions for the user device to access the content via a platform of the preferred content provider. In some embodiments, the logic causes the system to send the message to the user device of the recipient via a desired message format that was determined by the user.

These and additional features provided by the embodiments of the present disclosure will be more fully understood in view of the following detailed description, in conjunction with the drawings.

BRIEF DESCRIPTION OF THE DRAWINGS

The embodiments set forth in the drawings are illustrative and exemplary in nature and not intended to limit the disclosure. The following detailed description of the illustrative embodiments can be understood when read in conjunction with the following drawings, where like structure is indicated with like reference numerals and in which.

DETAILED DESCRIPTION

Embodiments disclosed herein include systems and methods for sharing content. Some embodiments allow a user to send a song or other content to another person via voice command to a vehicle computing device. Specifically, a vehicle can include a voice receiver system (e.g., microphones) and any suitable voice recognition technology that can analyze received voice inputs. The system can be configured to analyze user voice inputs to determine whether such voice inputs include a request to send content to a third party. The vehicle can have access to the personal contacts of the user, which can be stored onboard the vehicle, on a portable communication device of the user, or in some other location.

If a user is listening to a song while driving, the user may wish to share the song with his or her friend. The song may be playing on the radio, satellite radio, Spotify, iPod, music application, CD, or other source. The user can provide a voice command to the vehicle by speaking aloud (e.g., "Send Bob the song that is playing right now."). The voice input can be received by the vehicle and analyzed to understand the request. The vehicle can search the user's contacts to identify "Bob." Embodiments may be configured to identify the song and determine the other aspects of the communication, such as the source of the song, how the recipient can play the song, etc.

Some embodiments may be configured to collect data about the song and send that data to the designated recipient. These embodiments do not necessarily share the music as a file, but may send the pertinent information/metadata to the identified contact(s). The song information can be sent in any suitable manner, such as via a text message (e.g., SMS or other textual based messaging protocol), an electronic mail message, etc. or in a manner specified by the contact(s). Any comments provided by the user can also be sent to the recipient(s).

Some embodiments may be configured to determine a source of the song being played by the user. When the user sends the song to the recipient, the user's system communicates with a central server (and/or the recipient device) to determine the desired format and/or music provider. As an example, if the user is listening to a song using Spotify™, when the user sends the song, embodiments may determine that the recipient prefers to use Pandora™. As such, these embodiments may format the request for providing to the user via Pandora™. In some embodiments, further user preferences of the recipient may also be provided. Accordingly, the systems and methods for sharing content incorporating the same will be described in more detail, below.

Figure 1:
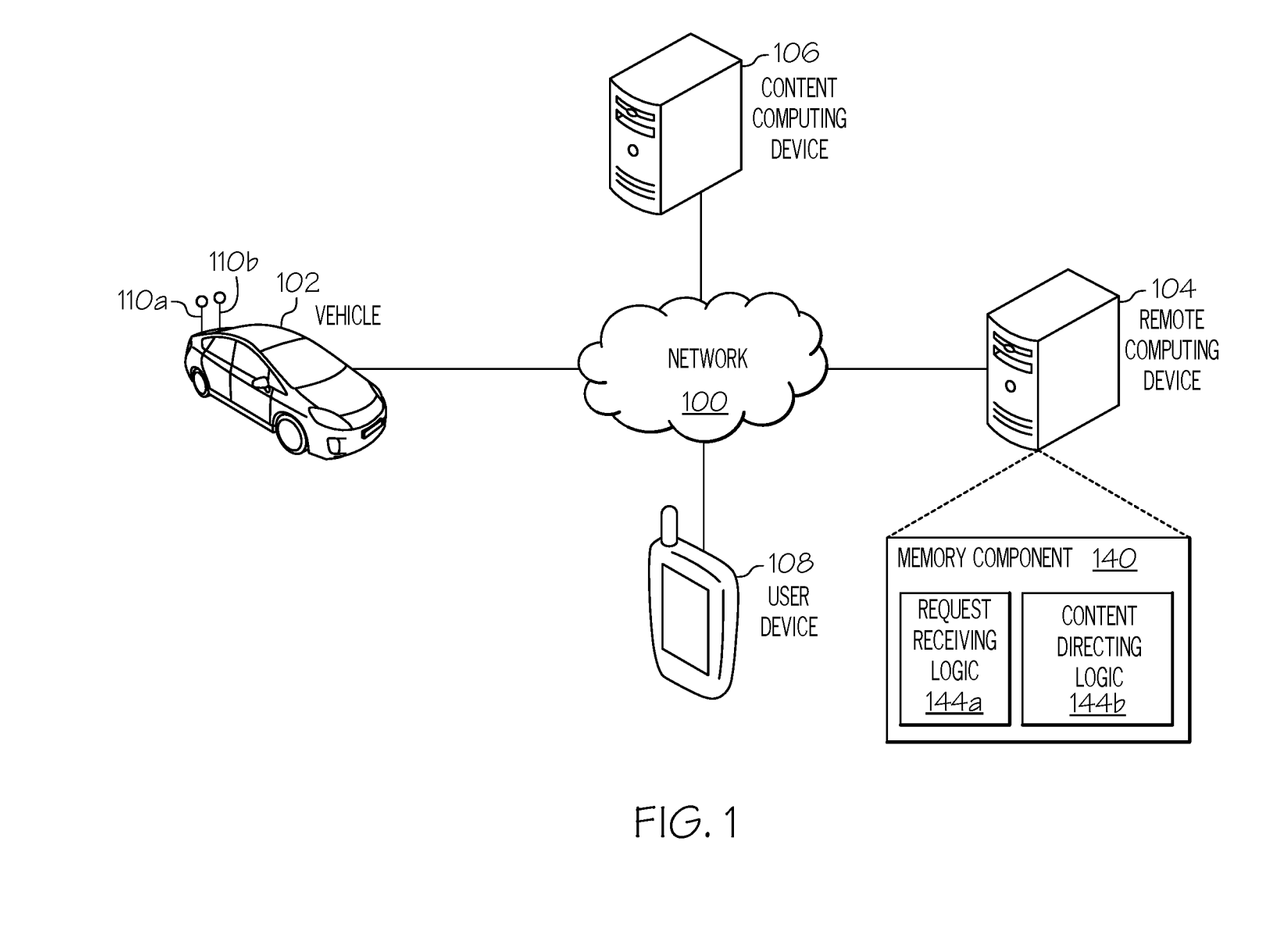
FIG. 1 depicts a computing environment for sharing content, according to embodiments described herein.

Referring now to the drawings, FIG. 1 depicts a computing environment for sharing content, according to embodiments described herein. As illustrated, the computing environment includes a network 100 that couples a vehicle 102, a remote computing device 104, a content computing device 106, and a user device 108.

Specifically, the network 100 may include any wide area network (such as the internet, a mobile cellular network, a wireless data network, a public switch telephone network, and/or the like) or local network (such as a local area network, a wireless fidelity network, a Bluetooth network, and/or the like). Additionally, the network 100 may represent any infrastructure or protocol to facilitate device-to-device communications, with or without an intermediary.

The vehicle 102 may include any land-based, air-based, or water based vehicle and may be coupled to the network 100 (such as via a vehicle computing device 230 depicted in FIG. 2) for communicating data with one or more of the other devices depicted in FIG. 1. The vehicle 102 may include a receiver 110a for receiving content via the network 100 (which may be configured as an antenna, a radio receiver, and/or other hardware for receiving content) and a transmitter 110b for transmitting data via the network 100 (which may be part of the same hardware as the receiver 110a and/or may be separate, depending on the embodiment). As such, some embodiments described herein may utilize the vehicle 102 and vehicle computing device 230 (FIG. 2) for sending data related to the content to a second user (recipient). It will be understood that the vehicle 102 and vehicle computing device 230 could receive content as well.

Similarly, the remote computing device 104 may be configured as a personal computer, laptop, tablet, mobile device, server, and/or other computing device for performing the functionality described herein. As such, the remote computing device 104 may include a memory component 140 that stores request receiving logic 144a and content directing logic 144b. The request receiving logic 144a may be configured to cause the remote computing device 104 to receive a request from a first user to share content with a second user. Similarly, the content directing logic 144b may be configured for determining a desired format for delivering the content to the second user as well as facilitating the sending in the determined format.

The content computing device 106 may be configured as a personal computer, laptop, tablet, mobile device, server, and/or the like and may be configured for providing content to a user. As an example, the content computing device 106 may provide the Spotify™ content library, the Pandora™ content library, the iTunes™ library, the Netflix™ content library, the Hulu™ content library, the YouTube™ content library, and/or the like. As will be understood, each of these services may provide content in a different format and/or protocol (and some may provide options for providing content in different formats). As such, embodiments described herein may utilize content received from the content computing device 106 (which may represent any content providing service) to provide content in a desired format.

Additionally included in FIG. 1 is the user device 108. The user device 108 may be configured as a personal computer, laptop, mobile device, server, or other computing device with which a user may interact. As discussed above, the user device 108 may be operated by a second user who will receive content from the first user. As such, the user device 108 may have the capability to determine a preferred content format for the second user.

Specifically, embodiments may be configured such that the vehicle 102 provides content to a user, such as audio, video, imagery, etc. in a first format. The first format may be over-the-air television, over-the-air radio (e.g., FM, AM), satellite television (e.g., via DirecTV™, Dish™, etc.), satellite radio (e.g., via Sirius™, XM™, etc.), cable television (e.g., via Time Warner™, Comcast™, etc.), internet video (e.g., via Netflix™, Amazon™, YouTube™, etc.), internet audio (e.g., via Pandora™, Spotify™, etc.), and/or other format. In some embodiments, the user specifically selects the format of content, while some embodiments may be configured for the vehicle computing device 230 (FIG. 2) to select the format.

Figure 2:
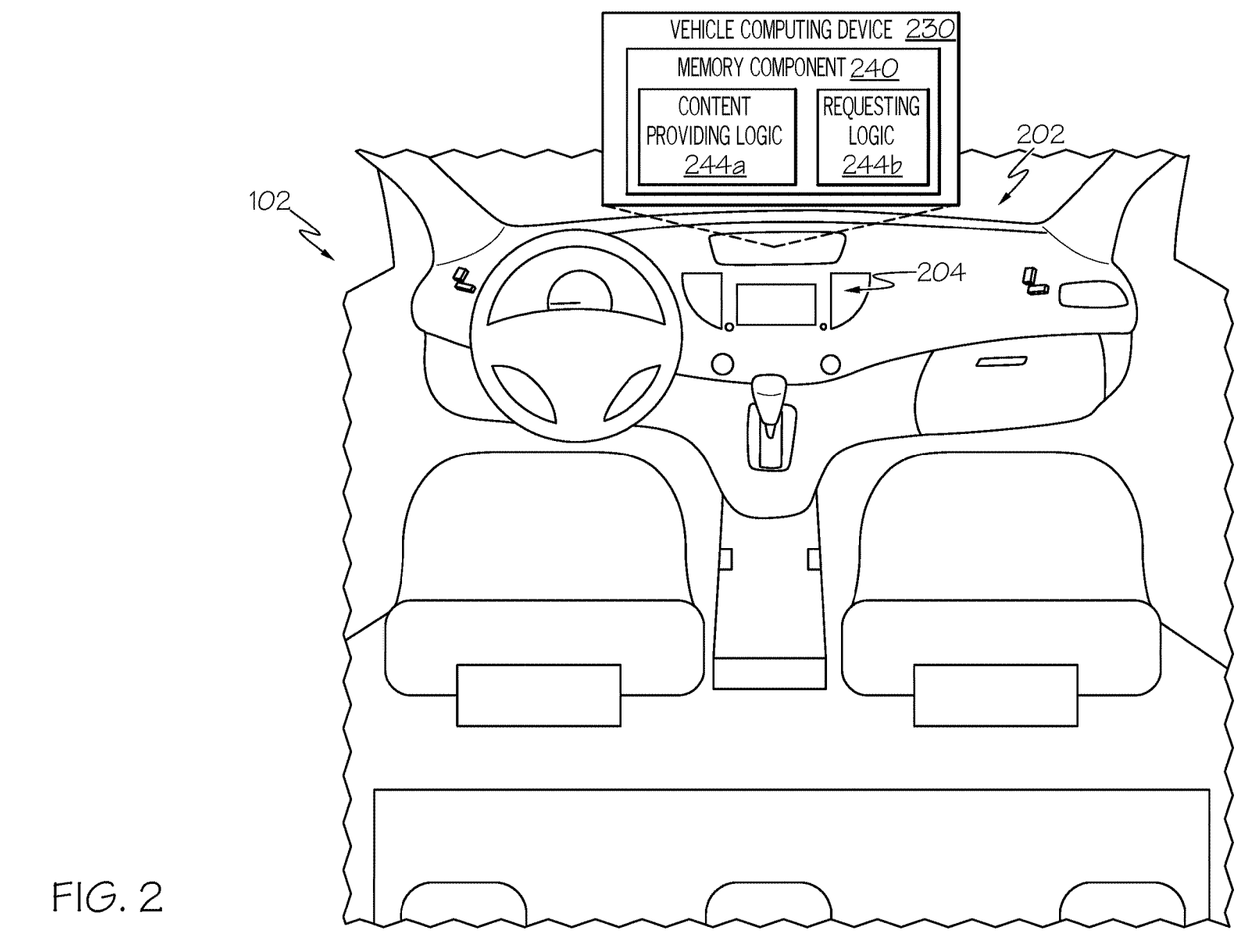
FIG. 2 depicts a vehicle interior for sharing content, according to embodiments described herein.

FIG. 2 depicts a vehicle interior 202 for sharing content, according to embodiments described herein. As illustrated, the vehicle interior 202 may include a head unit 204, which may include an input device (which may include a touchscreen, buttons, a microphone, etc.), an output device (such as a display, a speaker, a tactile output device, etc.), as well as any antennas, transmitters, receivers, amplifiers, etc. for receiving content. In some embodiments, this hardware is not necessarily part of the head unit 204, but communicates with the head unit 204 to provide the content. The head unit 204 may include the vehicle computing device 230, which includes a memory component 240 that stores content providing logic 244a and requesting logic 244b.

The content providing logic 244a may include applications, software, etc. that facilitate providing of the content to the user. As an example, the content providing logic 244a may include a Pandora™ application, a Spotify™ application, and/or other application for providing the content. For the content sources that do not utilize an application (e.g., FM radio), the content providing logic 244a may include logic that identifies the content that is being provided. As an example, the Pandora™ application may be configured to communicate the provided content, but an FM radio may (or may not) have this capability. As such, the content providing logic 244a may be configured to recognize the content and/or communicate with another device to identify the content being provided.

The requesting logic 244b may be configured to provide one or more user interfaces for sending content to a second user. Accordingly, the requesting logic 244b may be configured to communicate with the remote computing device 104 (FIG. 1) and/or other devices for facilitating sending of the content as described herein.

Figure 3:
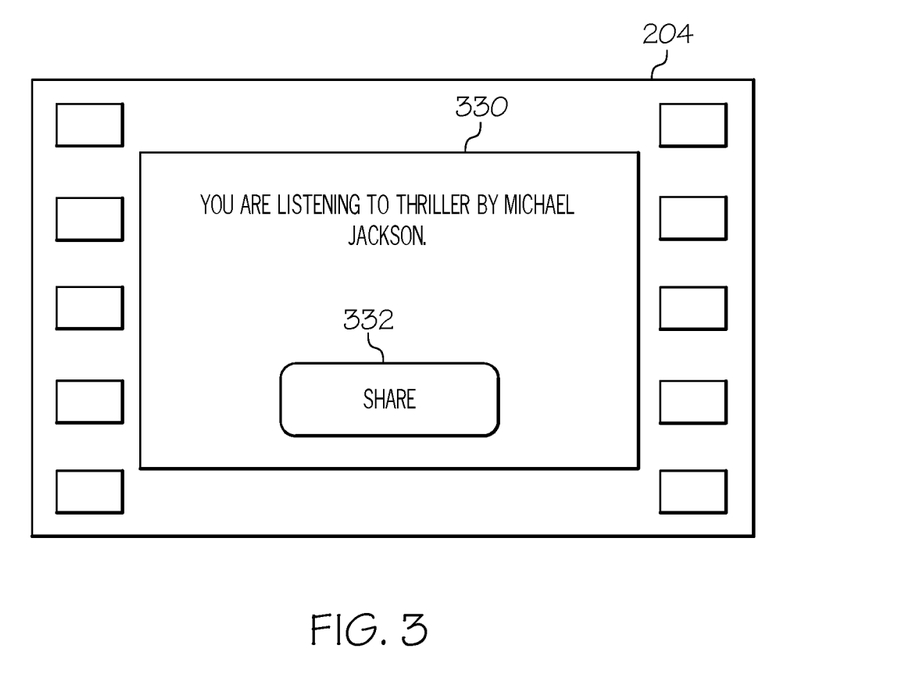
FIG. 3 depicts a user interface for sharing content, according to embodiments described herein.

FIG. 3 depicts a user interface 330 for sharing content, according to embodiments described herein. As illustrated, the user interface 330 may provide the content that the user is currently viewing. As discussed above, the content may be provided via terrestrial radio (AM, FM), satellite radio, internet radio, and/or other radio or video content. Accordingly, the user interface 330 also provides a share option 332 for the user to share the content with a recipient.

It should be understood that while the user interface 330 may provide the option 332, some embodiments may include a voice recognition system (local and/or cloud-based) and/or virtual assistant that is configured to receive and process a voice command. The voice command interface may work in conjunction with the user interface 330 (and other user interfaces provided herein) and/or may be provided instead of touch screen interfaces, in some embodiments.

Figure 4:
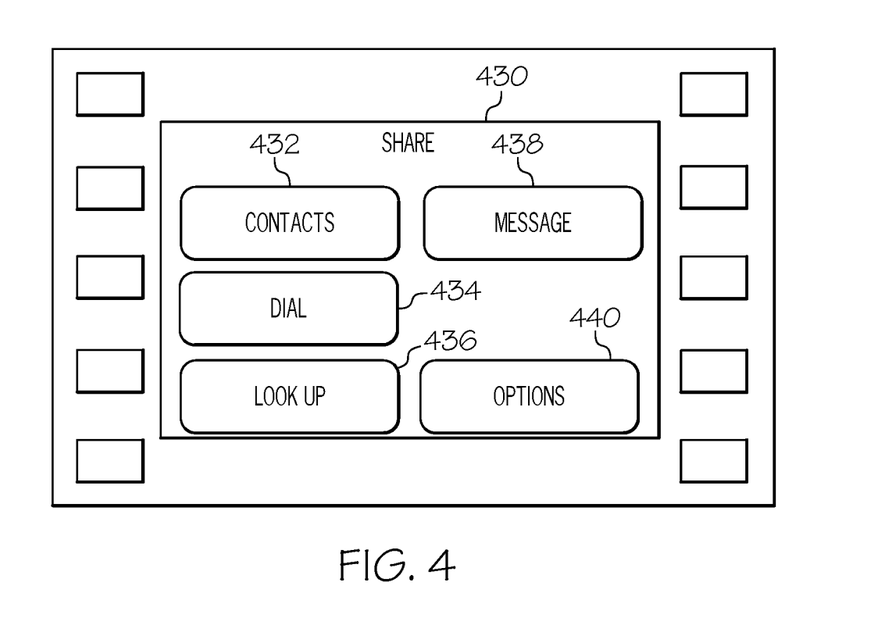
FIG. 4 depicts a user interface that provides a plurality of options related to sharing content, according to embodiments described herein.

FIG. 4 depicts a user interface 430 that provides a plurality of options related to sharing content, according to embodiments described herein. In response to a user selection of the share option 332 from FIG. 3, the user interface 430 may be provided. As illustrated, the user interface 430 includes a contacts option 432, a dial option 434, a lookup option 436, a message option 438, and an options option 440. In response to a user selection of the contacts option 432, the user may search and/or browse his/her personal contacts to locate a recipient for the content. The contacts may be located on the head unit 204, on a mobile device that is in communication with the head unit 204, and/or elsewhere, such as on the cloud. In response to a user selection of the dial option 434, the user may dial the telephone number, email address, and/or other recipient address for sending the content. In response to a user selection of the look up option 436, the user may perform a search, such as via a search engine, for the person to whom the user wishes to send the content.

Also provided is the message option 438. In response to a user selection of the message option 438, the user may create a message to send to the recipient that accompanies the content. Specifically, the user may determine the format of the message that is sent with the content, as well as a custom message to send with the content. As an example, the user may indicate that the message format will be a text message, email, voice message (such as a telephone call, a text to voice messaging protocol, etc.), social media message, etc. Additionally, the user may indicate that the custom message "check this out!" will be provided with the content. In response, the head unit 204 may send the content and custom message in the desired message format (either itself or via use of a connected mobile device, cloud-based device, etc.). In response to a user selection of the options option 440, the user may be provided with additional options regarding default messaging formats, preconfigured custom messages, etc., as discussed with regard to FIG. 5.

Figure 5:
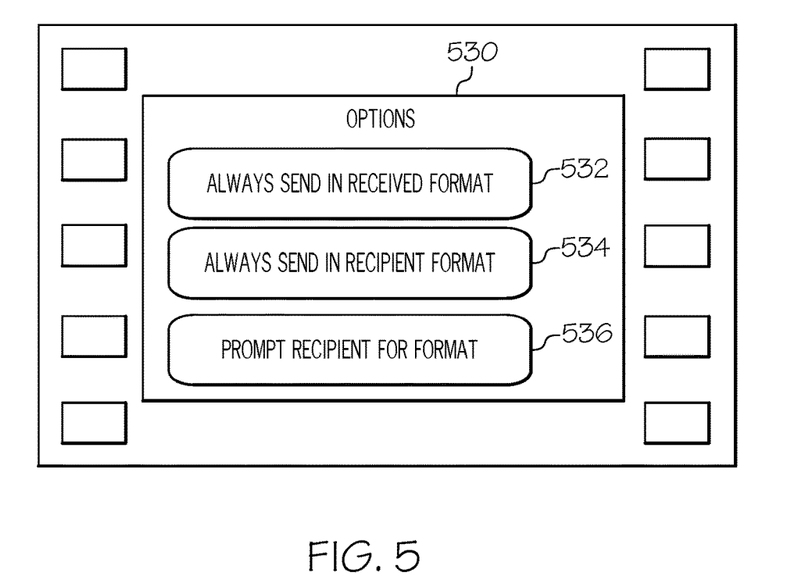
FIG. 5 depicts a user interface that provides a plurality of formatting options for sending content, according to embodiments described herein.

FIG. 5 depicts a user interface 530 that provides a plurality of formatting options for sending content, according to embodiments described herein. In response to a user selection of the options option 440 from FIG. 4, the user interface 530 may be provided. As illustrated, the user interface 530 may include receive option 532, a recipient option 534, and a prompt option 536. In response to a user selection of the receive option 532, the user may set a default setting that the content is always communicated to be played in the format that the first user received the content. As an example, if the first user was listening to Pandora™, then the content would be sent to play via Pandora™ on the user device 108.

In response to a user selection of the recipient option 534, the content would always be sent in a recipient identified format. Specifically, if the content is being sent to John, the head unit 204 may first communicate the user device 108 that is controlled by John. The user device 108 may respond with a desired format, which may be stored by the head unit 204 (or other device) for future reference. This format would be used as a default. In response to a user selection of the prompt option 536, the head unit 204 may always prompt the recipient device for the desired format of the content.

It should be understood that while the options 532-536 relate to format of the content, other options may also be provided. As an example, options related to default message format, preconfigured custom messages, and/or other options may also be provided.

Figure 6:
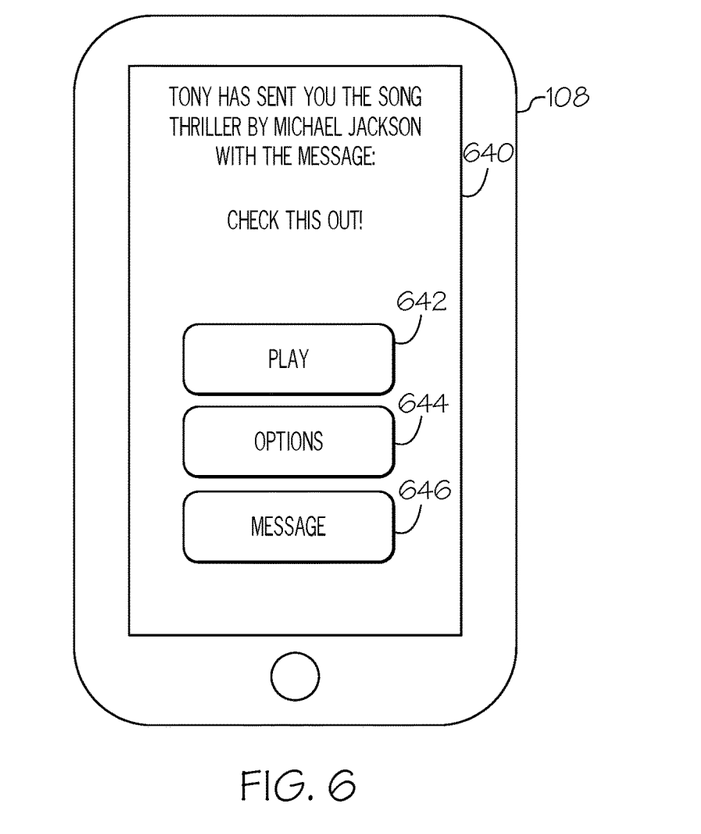
FIG. 6 depicts a user interface for receiving content, according to embodiments described herein.

FIG. 6 depicts a user interface 640 for receiving content, according to embodiments described herein. As illustrated, the user interface 640 may be provided by the user device 108 (FIG. 1) of a recipient of the content. The user interface 640 provides an indication that content has been sent to the recipient. Additionally, the custom message is also provided, along with one or more options.

Specifically, a play option 642 may be provided for playing the content. Depending on the embodiment, the content may be sent as a file with the message and selection of the play option 642 merely launches a media player on the user device 108 to play the attached content. In some embodiments, the play option 642 may operate as a hyperlink, address, or other link to launch a content providing service to provide the content. As an example, some embodiments may provide the content in the same format that the first user viewed the content. Thus, if the first user was listening to the content via Pandora™, in response to a user selection of the play option 642, the user device 108 will launch a Pandora™ application or website to play the content. Similarly, some embodiments may be configured such that, despite the format that the first user viewed the content (or any other settings provided by the first user), the second user desires that all audio content be provided by Spotify™ (to the extent possible). As such, the user device 108 may receive the message from the first user and identify the content. Once the content is identified, the user device 108 may launch the desired service provider to playing the content.

Also provided in the user interface 640 is an options option 644. In response to a user selection of the options option 644, the recipient may determine content playback options and/or other options. In response to a user selection of a message option 646, the recipient may respond to the first user with a custom message.

Figure 7:
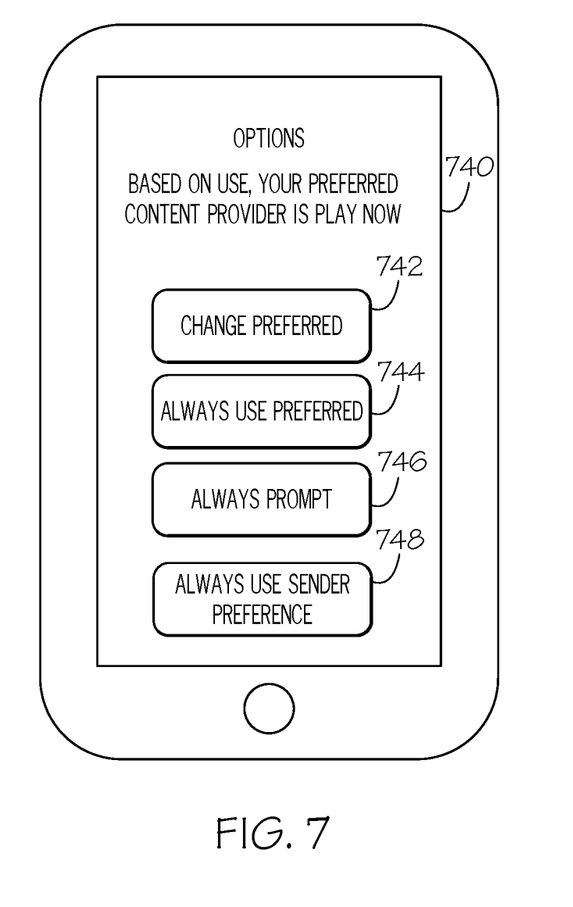
FIG. 7 depicts a user interface for determining a format to receive content, according to embodiments described herein.

FIG. 7 depicts a user interface 740 for determining a format to receive content, according to embodiments described herein. In response to a user selection of the options option 644 from FIG. 6, the user interface 740 may be provided. As illustrated, the user interface 740 may provide a currently desired content service for playing received content (identified as "Play Now" in FIG. 7). The user interface 740 also provides a change preferred option 742, an always option 744, a prompt option 746, and a sender preference option 748. In response to a user selection of the change preferred option 742, the preferred content provider may be altered. It will be understood that while a single content provider listed in the user interface 740, this is just an example. Some embodiments may provide different preferred content providers, based on the content format, the sender, and/or other criteria. As an example, video may be provided via a first content provider, while audio may be provided via a second content provider.

In response to a user selection of the change preferred option 744, the user device 108 will always use the preferred content provider. In response to a user selection of the prompt option 746, the user device 108 will prompt the user upon receiving the content. In response to a user selection of the sender preference, the user device 108 will defer to the format selected by the first user (the sender) of the content.

As a working example, the first user may listen to a piece of audio content via FM radio. The vehicle computing device 230 may identify the audio content as "Thriller." The vehicle computing device 230 may then receive user input to send the audio content to a recipient with the message "check this out!" The vehicle computing device 230 may determine a message format for sending the message. Additionally, the vehicle computing device 230 may determine a format for providing the content. In some embodiments, the content format is determined based on a selection of the sender. However, in some embodiment, the vehicle computing device 230 communicates with the user device 108 (the recipient's device) to determine the preferred format for the content.

If the preferred content format is Spotify™, the vehicle computing device 230 may communicate with the remote computing device 104 to locate the content in the Spotify™ library and may create a link to that content. As some content platforms may require a user account to access content, some embodiments may utilize the sender's account to provide the content and/or the content platform may require the recipient to have an account as well. If the sender does not have an account with this platform, the vehicle computing device 230 may retrieve a user identifier for the recipient's account and communicate with remote computing device 104 to indicate that the recipient will be viewing the content. Thus, when the recipient selects the play option 642 (FIG. 6), that user identifier is authenticated by the user device 108.

While some embodiments are configured for the sender to format the content, some embodiments may be configured such that the user device 108 (the recipient's device) receives identifying data of the sent content and access the desired format for providing that content. As will be understood, such an embodiment may utilize specific logic for understanding the request from the vehicle computing device 230 (sender's device) to properly format the content.

Figure 8:
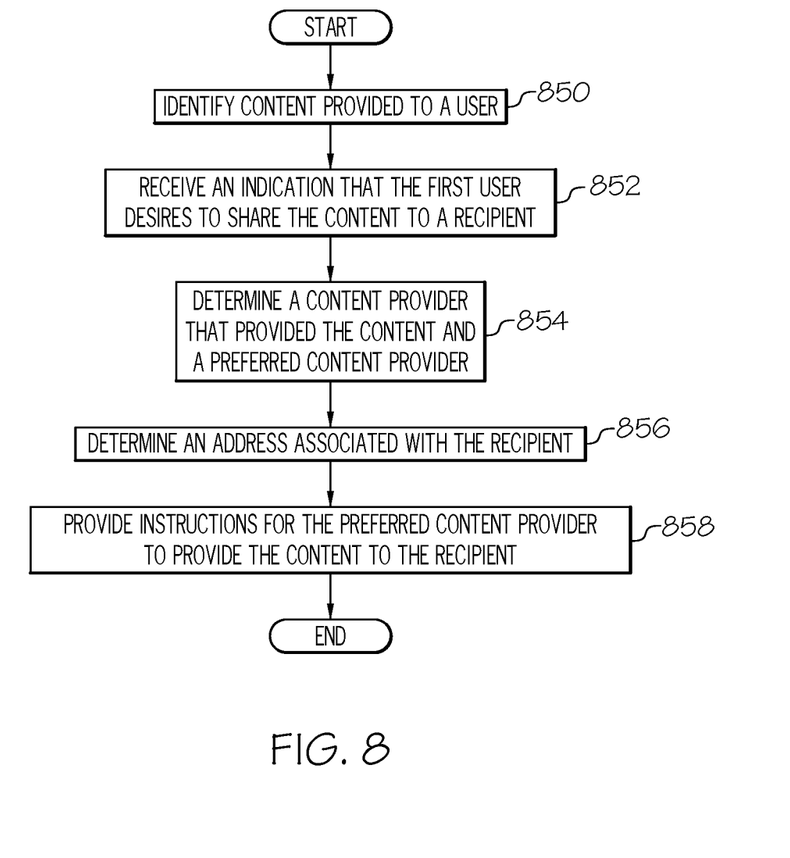
FIG. 8 depicts a flowchart for sharing content, according to embodiments described herein.

FIG. 8 depicts a flowchart for sharing content, according to embodiments described herein. As illustrated in block 850, an identity of content provided to a user may be determined. In block 852, an indication that the first user desires to share the content with a recipient may be received. In block 854, a content provider that provided the content to the user and a preferred content provider of the recipient may be determined. In block 856, an address associated with the recipient may be determined. In block 858, instructions for providing the content to the recipient via the preferred content provider may be provided. As described above, the recipient may then retrieve the content via the preferred content provider.

Figure 9:
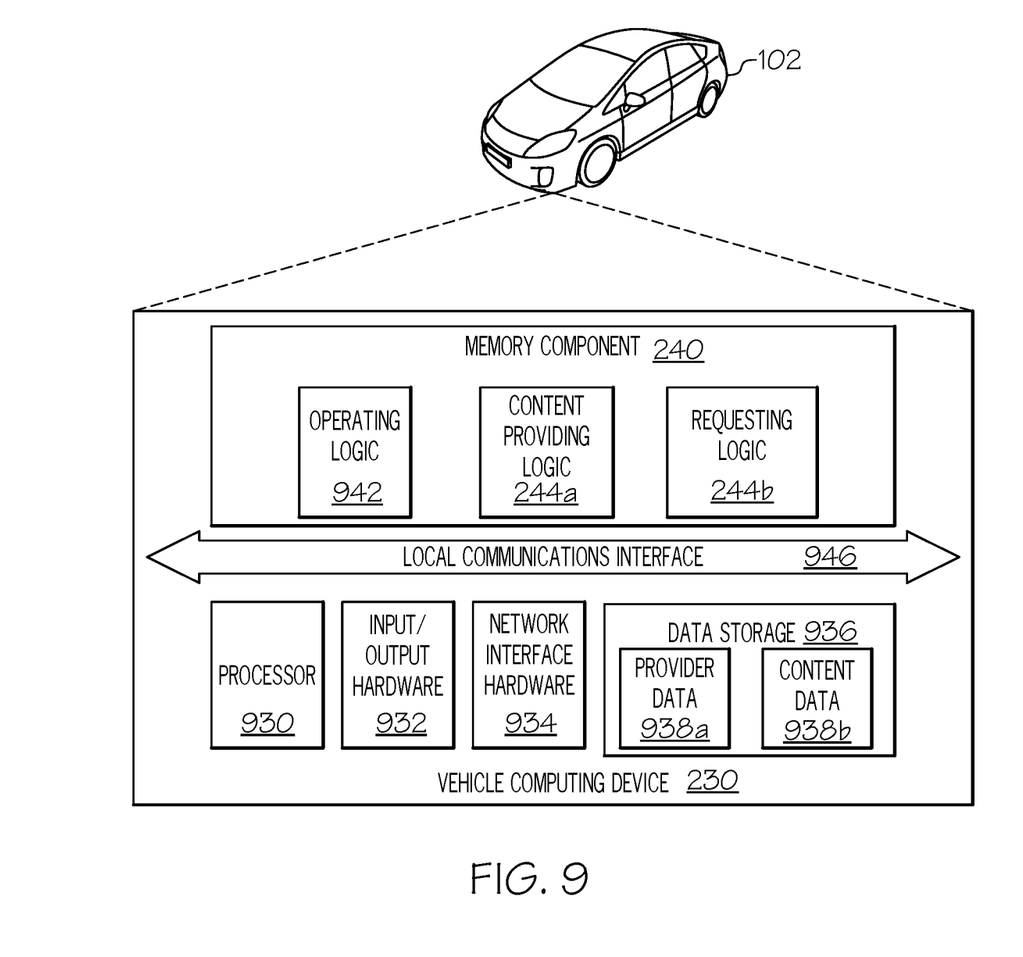
FIG. 9 depicts a remote computing device for sharing content, according to embodiments described herein.

FIG. 9 depicts a remote computing device 104 for sharing content, according to embodiments described herein. The vehicle computing device 230 includes a processor 930, input/output hardware 932, the network interface hardware 934, a data storage component 936 (which stores provider data 938a, content data 938b, and/or other data), and the memory component 240. The memory component 240 may be configured as volatile and/or nonvolatile memory and as such, may include random access memory (including SRAM, DRAM, and/or other types of RAM), flash memory, secure digital (SD) memory, registers, compact discs (CD), digital versatile discs (DVD), and/or other types of non-transitory computer-readable mediums. Depending on the particular embodiment, these non-transitory computer-readable mediums may reside within the vehicle computing device 230 and/or external to the vehicle computing device 230.

The memory component 240 may store operating logic 942, the content providing logic 244a and the requesting logic 244b. The content providing logic 244a and the requesting logic 244b may each include a plurality of different pieces of logic, each of which may be embodied as a computer program, firmware, and/or hardware, as an example. A local communications interface 946 is also included in FIG. 9 and may be implemented as a bus or other communication interface to facilitate communication among the components of the vehicle computing device 230.

The processor 930 may include any processing component operable to receive and execute instructions (such as from a data storage component 936 and/or the memory component 240). As described above, the input/output hardware 932 may include and/or be configured to interface with the components of the vehicle 102, such as the head unit 204, the sensors, the motors, etc.

The network interface hardware 934 may include and/or be configured for communicating with any wired or wireless networking hardware, including an antenna, a modem, LAN port, wireless fidelity (Wi-Fi) card, WiMax card, Bluetooth chip, USB card, mobile communications hardware, and/or other hardware for communicating with other networks and/or devices. From this connection, communication may be facilitated between the vehicle computing device 230 and other computing devices, such as via the internet, to provide the functionality described herein.

The operating logic 942 may include an operating system and/or other software for managing components of the vehicle computing device 230. As also discussed above, the content providing logic 244a may reside in the memory component 240 and may be configured to cause the processor 930 provide content and/or identify the content being provided. Similarly, the requesting logic 244b may be utilized to provide user interfaces, as well as send content to a recipient and request a preferred content provider for the recipient device.

It should be understood that while the components in FIG. 9 are illustrated as residing within the vehicle computing device 230, this is merely an example. In some embodiments, one or more of the components may reside external to the vehicle computing device 230. It should also be understood that, while the vehicle computing device 230 is illustrated as a single device, this is also merely an example. In some embodiments, the routing logic 244a and the requesting logic 244b may reside on different computing devices. As an example, one or more of the functionality and/or components described herein may be provided by another computing device, such as the user device 108, the remote computing device 104, etc.

Additionally, while the vehicle computing device 230 is illustrated with the routing logic 244a and the requesting logic 244b as separate logical components, this is also an example. In some embodiments, a single piece of logic may cause the vehicle computing device 230 to provide the described functionality.

As illustrated above, various embodiments for sharing content are disclosed. These embodiments may reduce bandwidth consumption by communicating content without actually sending the content. Additionally, these embodiments may provide that a recipient of content view the content in the desired format, regardless of the format viewed by the sender.

While particular embodiments and aspects of the present disclosure have been illustrated and described herein, various other changes and modifications can be made without departing from the spirit and scope of the disclosure. Moreover, although various aspects have been described herein, such aspects need not be utilized in combination. Accordingly, it is therefore intended that the appended claims cover all such changes and modifications that are within the scope of the embodiments shown and described herein.

It should now be understood that embodiments disclosed herein include systems, methods, and non-transitory computer-readable mediums for sending content. It should also be understood that these embodiments are merely exemplary and are not intended to limit the scope of this disclosure.

What is claimed is:

1. A method for sharing content comprising:
   identifying, by a computing device, content provided to a user;
   receiving, by the computing device, an indication that the user desires to share the content to a recipient at a recipient device;
   determining, by the computing device, a content provider that provided the content to the user;
   determining, by the computing device, a selection by the user of a first option related to whether to send the content according to a user-specified format or a recipient-specified format;
   determining, by the computing device, a selection by the recipient of a second option related to whether the recipient will receive the content according to the user-specified format or the recipient-specified format;
   determining, by the computing device, from the selection by the user of the first option and the selection by the recipient of the second option, a desired format to send the content;
   determining, by the computing device, an address associated with the recipient; and
   providing, by the computing device, instructions for a content provider associated with the desired format to provide the content to the recipient device.

2. The method of claim 1, further comprising providing a message that includes a link to the content to be provided by the preferred content provider.

3. The method of claim 1, further comprising providing an option to the user to select a message format.

4. The method of claim 3, wherein the option includes at least of the following message formats: a text message, an electronic mail message, a voice message, or a social media message.

5. The method of claim 1, further comprising receiving the content, wherein the content is received via at least one of the following formats: over-the-air radio, satellite radio, over-the-air television, cable television, satellite television, internet radio, or internet video.

6. The method of claim 1, further comprising communicating with the preferred content provider identified by the recipient device to grant the recipient with access to the content via a platform provided by the preferred content provider.

7. The method of claim 1, wherein the instructions include an option for the recipient to select to access the content and wherein the instructions are provided to the recipient device operated by the recipient and indicate to the recipient device how to access the content on a platform provided by the preferred content provider when the recipient selects the option.

8. A vehicle for sharing content comprising:
   a receiver for receiving content;
   a transmitter for communicating data related to the content; and
   a vehicle computing device that is communicatively coupled to the receiver and the transmitter and includes a processor and a memory component, wherein the memory component stores logic that, when executed by the processor, causes the vehicle computing device to perform at least the following:
   receive, via the receiver, the content from a first content provider;
   identify content that was received from the first content provider;
   provide an option to a user to share the content with a recipient device of a recipient;
   receive a user selection of the option to share the content to the recipient;
   determine a preferred content provider identified by the recipient device for sharing the content with the recipient;
   determine a selection by the user of a first option related to whether to send the content according to a user-specified format or a recipient-specified format;
   determine a selection by the recipient of a second option related to whether the recipient will receive the content according to the user-specified format or the recipient-specified format;
   determine from the selection by the user of the first option and the selection by the recipient of the second option, a desired format to send the content;
   determine an address associated with the recipient;
   generate a message to the recipient device of the recipient that includes instructions for the recipient device to access the content via a platform of the preferred content provider; and
   send, via the transmitter, the message to the recipient device of the recipient via a desired message format.

9. The vehicle of claim 8, further comprising a head unit that includes a display for providing the option to share the content with the recipient.

10. The vehicle of claim 8, wherein the logic further causes the vehicle computing device to determine the desired message format, and wherein the desired message format includes at least one of the following: a text message, an electronic mail message, a voice message, or a social media message.

11. The vehicle of claim 8, wherein the message includes an option for the recipient to select to access the content, wherein in response to the user selecting the option, the recipient device communicates with a remote computing device associated with the preferred content provider to provide the content to the recipient device.

12. The vehicle of claim 8, wherein the logic further causes the vehicle computing device to provide an option for the user to determine the preferred content provider.

13. The vehicle of claim 8, wherein the preferred content provider is determined from a setting on the recipient device, and wherein the logic further causes the vehicle computing device to communicate with the recipient device to determine the preferred content provider.

14. The vehicle of claim 8, wherein the logic further causes the vehicle computing device to receive a custom message to send with to the recipient in the message.

15. A system for sharing content comprising:
a computing device that includes a processor and a memory component, wherein the memory component stores logic that, when executed by the processor, causes the system to perform at least the following:
receive the content from a first content provider;
provide the content to a user;
identify content that was received from the first content provider;
determine a preferred content provider identified by a recipient device for sharing the content with a recipient;
determine a selection by the user of a first option related to whether to send the content according to a user-specified format or a recipient-specified format;
determine a selection by the recipient of a second option related to whether the recipient will receive the content according to the user-specified format or the recipient-specified format;
determine from the selection by the user of the first option and the selection by the recipient of the second option, a desired format to send the content;
determine an address associated with the recipient;
generate a message to a recipient device of the recipient that includes instructions for the recipient device to access the content via a platform of the preferred content provider, wherein the preferred content provider provides the content via a recipient identified format; and
send the message to the recipient device of the recipient via a desired message format that was determined by the user.

16. The system of claim 15, further comprising a remote computing device associated with the preferred content provider, wherein the logic further causes the system to communicate with the remote computing device to retrieve the instructions for the recipient to access the content via the platform of the preferred content provider.

17. The system of claim 15, wherein the logic further causes the system to determine the desired message format, and wherein the desired message format includes at least one of the following: a text message, an electronic mail message, a voice message, or a social media message.

18. The system of claim 15, wherein the logic further causes the system to receive a custom message to send with to the recipient in the message.

19. The system of claim 15, wherein the logic further causes the system to provide an option for the user to determine the preferred content provider.

20. The system of claim 15, wherein the preferred content provider is determined from a setting on the recipient device, and wherein the logic further causes the system to communicate with the recipient device to determine the preferred content provider.

* * * * *

UNITED STATES PATENT AND TRADEMARK OFFICE
CERTIFICATE OF CORRECTION

| | |
|---|---|
| PATENT NO. | : 11,729,123 B2 |
| APPLICATION NO. | : 15/830843 |
| DATED | : August 15, 2023 |
| INVENTOR(S) | : Scott A. Friedman et al. |

It is certified that error appears in the above-identified patent and that said Letters Patent is hereby corrected as shown below:

In the Specification

In Column 6, Line(s) 1, after "communicate", insert --with--.

In Column 6, Line(s) 40, delete "playing" and insert --play--, therefor.

In Column 8, Line(s) 54, delete "functionality" and insert --functionalities--, therefor.

Signed and Sealed this
Twenty-fifth Day of June, 2024

*Katherine Kelly Vidal*

Katherine Kelly Vidal
*Director of the United States Patent and Trademark Office*